Feb. 17, 1959    A. J. SORENSEN    2,874,337
METHOD OF AND MEANS FOR DETECTING ELECTRICAL CIRCUIT FAULTS
Filed July 14, 1954
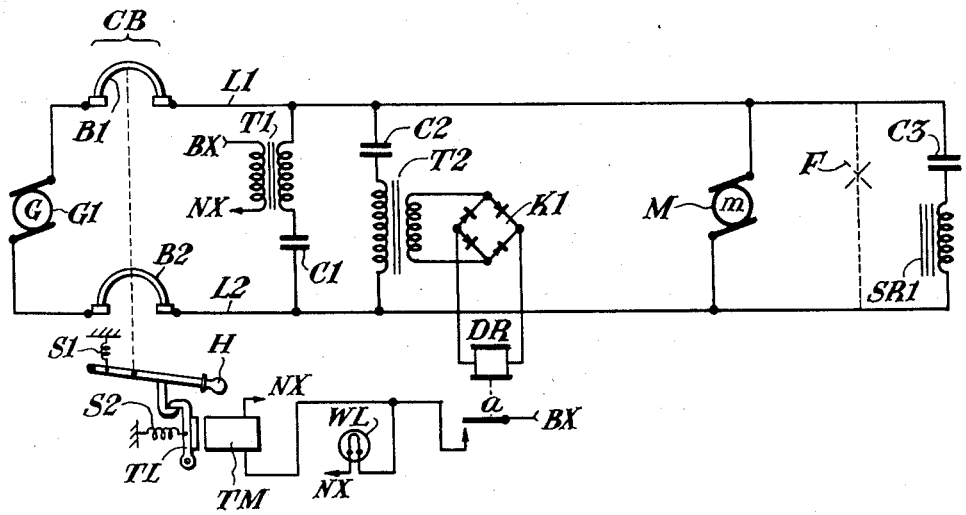
INVENTOR.
Andrew J. Sorensen.
BY W. L. Stout.
HIS ATTORNEY United States Patent Office 2,874,337
Patented Feb. 17, 1959

2,874,337

METHOD OF AND MEANS FOR DETECTING ELECTRICAL CIRCUIT FAULTS

Andrew J. Sorensen, Edgewood, Pa., assignor to Westinghouse Air Brake Company, Wilmerding, Pa., a corporation of Pennsylvania Application July 14, 1954, Serial No. 443,300

10 Claims. (Cl. 317—29)

My invention relates to a method of and means for detecting electrical circuit faults, and particularly to an improved method of and means for detecting electrical circuit faults on power distribution systems.

It is customary practice in power distribution systems to provide circuit breakers or other interrupting apparatus arranged so that an overload of sufficient magnitude will cause the circuit breakers or interrupting apparatus to operate to cut off the energy supplied to the system in order to avoid damage to the generating equipment or the load equipment. Such circuit breakers are usually governed in such manner that an increase in the amount of the current supplied through the distribution system beyond a certain magnitude will cause the operation of the apparatus to open the connections to the source of power.

However, in many instances it is desirable to cause operation of the circuit interrupting apparatus only in the event of a short-circuit fault on the transmission system, but not in the event of a momentary overload due to the loads connected to the system. In such cases, the conventional apparatus is not suited for such operation, since there is no means for distinguishing whether the excess of current drawn is due to a short-circuit fault in the distribution system, or is due to an overload due to additional loads being connected to the line, or to loads such as motors being started, which momentarily draw much larger currents than those required for their normal running operation.

In mining operations, where a direct current distribution system is employed both for operating the mine trolleys which haul coal or ore from the mine, and also for furnishing power for the operation of various types of mining machinery, the distribution system is usually of the type in which the ground or grounded track rails of the mine tramway form a return circuit for the distribution system, while the other side of the circuit is formed by a trolley or feeder or a combination of the two, extending to various portions of the mine. The trolleys are usually supported from insulated hangers, but the conditions of environment and service are such that these insulating hangers quite often deteriorate, thereby allowing current to pass therethrough, to the ground return, thus causing not only a loss of power, but also a dangerous condition from the standpoint that the passage of the current through the roof of the mine may create sufficient heat to ignite the roof material or the wooden supports from which such trolley hangers are usually hung.

Accordingly, an object of my invention is to provide a novel method of and means for detecting electrical circuit faults, particularly in power transmission systems, which will distinguish between the currents drawn by the load apparatus and currents caused by a fault on the system.

Another object of my invention is to provide an improved arrangement for detecting electrical circuit faults, particularly on power distribution circuits, which is arranged so that the detection of a fault may cause the operation of circuit interrupting apparatus to cut off the supply of energy to the transmission system.

Another object of my invention is to provide an arrangement for detecting electrical circuit faults on a power distribution system which is arranged so that an indication may be supplied to an operator at a supply point that a fault condition exists on the line.

A further object of my invention is to provide an arrangement whereby the occurrence of either an open circuit fault or a low impedance shunting fault on a power distribution system initiates the operation of circuit interrupting apparatus to cut off the supply of energy to the transmission line, and simultaneously energizes an indicator for alerting an operator.

Other objects of my invention and features of novelty thereof will become apparent from the following description taken in connection with the accompanying drawing.

In practicing my invention, I utilize the method of supplying test energy to a power transmission network carrying energy at a given frequency, in which the test energy is supplied at a first frequency different from the frequency of the power being supplied over the system, transmitting said energy at the first frequency from a first point in the power distribution system to a second point in the system, converting this test energy at the second point in the system to test energy at a second frequency which is different from the power frequency, transmitting the test energy at the second frequency from the second point in the system to the first point in the system, and measuring the magnitude of the test energy of the second frequency at the first point in the system.

In accomplishing this method, I provide means at the supply point for supplying test energy at a first frequency to the transmission system, means at a second point on the network for receiving this test energy and converting it to test energy of a second frequency which is different from the given or power frequency, and retransmitting the test energy from the second point back to the first point, where I provide means which is responsive to the magnitude of the test energy received at the second frequency. This test energy received at the second frequency may be utilized to govern the operation of suitable circuit interrupting apparatus for cutting off the supply of power to the system and/or operating suitable warning indicators or lamps for indicating to a control operator that a fault exists on the system.

In a preferred embodiment of my invention, wherein a direct current distribution system is involved employing a single transmission line to carry energy from a direct current source to one or more direct current loads, I provide means for supplying alternating current energy preferably at a commercial frequency, such as 60 cycles per second, to the transmission line at the supply point, through suitable means for preventing the flow of direct current energy to the alternating current source, and at the remote end of the line I provide a suitably proportioned circuit including a saturable core reactor and a capacitor, so chosen that the alternating current energy which flows therethrough causes the combination to be operated in the ferroresonant domain with the result that a large percentage of the third harmonic frequency of the alternating current supply frequency will appear across the transmission line at the remote end of the line from the supply point. This energy flows back over the transmission line to the supply point, where there is also provided a filter circuit tuned to the third harmonic frequency of the alternating current energy, for example, 180 cycles per second, and which filter means includes in its output circuit a relay which is proportioned and arranged so that, with the apparatus in its normal condition and no faults existing on the line, the contacts of the relay will be picked up. When a fault appears on the line, the alternating current energy at the first frequency, that is 60 cycles per second, is short-circuited by the fault, as well as the 180 cycle per second frequency supplied from the frequency conversion apparatus at the remote end of the line, so that the output of the filter at the supply point will fall below a predetermined value, at which point the contacts of the detector relay will release, and cause the operation of conventional circuit interrupting apparatus, or operate a warning signal, or both. Since the load circuits, which, for example, may be the motors employed in conventional mining machinery or in mining locomotives, have essentially a high reactance to alternating current, insufficient alternating current energy will flow therethrough to interfere with the proper operation of the apparatus. Accordingly, it will be seen that the circuit interrupting apparatus will not be operated by the current drawn by the loads, but will be operated in the event that a fault occurs on the line.

The apparatus also supplies simultaneously protection against an open circuit fault. In the event that the continuity of a conductor of the transmission line is interrupted, the circuit interrupting means will be activated to cut off the supply of energy to the line. This is desirable in that a safety feature is incorporated. That is, a broken conductor of the transmission line, which may allow the conductor to assume a position such that personnel may come into contact with it and thereby create a hazardous condition, results in the supply of energy being cut off from the transmission line. Energy cannot be restored to the line until the faulty condition has been corrected.

In the accompanying drawing, the single figure shows an arrangement of apparatus utilizing the method of my invention, and comprising a novel arrangement of apparatus for detecting the presence of faults on a transmission line.

Referring to the drawing, there is shown a transmission line including the conductors L1 and L2, extending from a supply point to a load such as the motor M which may be located at the remote end of the line circuit or at an intermediate point thereof. Direct current energy is supplied to this transmission system from a suitable generator G1, operated by suitable prime mover means not shown. The energy supplied to the conductors L1 and L2 is carried over contacts B1 and B2 of a circuit breaker designated by the general reference character CB, and which is shown in a diagrammatic form. The contacts B1 and B2 of the circuit breaker are mechanically connected to a pivoted handle H, which is urged in an upward direction so as to open the contacts by a suitable spring means S1. The upward motion of the handle H is restrained by a suitable hook which engages a trip latch TL, biased into a hook-engaging position by a suitable spring S2. The trip latch TL is provided with an armature which is adapted to be attracted to a trip magnet TM when the trip magnet TM is energized. When the trip latch TL is swung away from the hook by energization of the trip magnet TM, the operating spring S1 will force the handle H upward, and the contacts B1 and B2 will accordingly be opened to cut off the supply of energy from generator G1 to the transmission line. It is to be understood that the apparatus shown is in a diagrammatic form, and any suitable arrangement of circuit interrupting apparatus may be employed.

At the supply point, alternating current energy furnished by a suitable source, not shown, and having the reference characters BX and NX for designating its terminals, is supplied to the transmission line through a transformer T1, with a capacitor C1 connected in series with the secondary winding of transformer T1, to form a series-resonant circuit for the frequency of the alternating current energy supplied, which, for example, may be 60 cycles per second. The capacitor C1 prevents the flow of direct current energy from the generator G1 through the secondary winding of transformer T1, and at the same time causes the combination of the inductive reactance of transformer T1 and the capacitor C1 to form a series-resonant circuit to thereby increase the amount of alternating current energy which can flow through the secondary winding of the transformer to the transmission line. Also connected across the conductors L1 and L2 at the supply point is a circuit including a capacitor C2 and the primary winding of a transformer T2, the secondary winding of the transformer T2 being connected to the input terminals of a full-wave rectifier K1, which has its output terminals connected to the winding of a detector relay DR. The parts are proportioned and arranged so that the combination including the capacitor C2 and the transformer T2 is tuned to series-resonance at a frequency equal to the third harmonic frequency of the energy supplied from terminals BX and NX, for example, 180 cycles per second, when the supply frequency is 60 cycles per second. The parts are proportioned and arranged so that the contacts of the detector relay DR will be picked up when and only when a predetermined amount of energy at the 180 cycle per second frequency is supplied to the filter means comprising capacitor C2 and transformer T2.

At the remote end of the transmission system, a capacitor C3 and a saturable reactor SR1 are connected in series across the conductors L1 and L2. Capacitor C3 and saturable reactor SR1 are proportioned and arranged so that the 60 cycle alternating current energy which flows therethrough will cause the generation of a large amount of energy at the third harmonic frequency, namely, 180 cycles per second.

From the foregoing description, it will be apparent that under normal conditions, 60 cycle energy is supplied to the transmission system at the supply point, flows over the conductors L1 and L2 to the remote end of the system, where it is converted to 180 cycle energy, which energy can flow back over conductors L1 and L2 and through the filter including capacitor C2 and transformer T2, to thereby energize the detector relay DR and retain its contacts in the picked-up position. Since each of the circuits in which the alternating current energy flows includes a series capacitor, it will be seen that none of the direct current energy supplied from generator G1 can flow through these circuits. Conversely, because of the inherent reactance of the generator G1 and the load such as the motor M, only a very small portion of alternating current energy can flow through these portions of the circuits.

Let it now be assumed that a short-circuit fault, such as the fault F indicated by the dotted lines, occurs at some point on the system. It will be seen that such a fault will not only allow direct current energy to flow therethrough, but will also permit the flow of alternating current energy. A portion of the 60 cycle energy supplied to the conductors L1 and L2 at the supply point will be shunted away from the capacitor C3 and the saturable reactor SR1 at the remote end of the line, due to the 60 cycle current flowing through the fault, so that a lesser amount of 60 cycle energy reaches the remote end of the line. Thus, a smaller magnitude of 180 cycle harmonic energy will be generated by the combination including capacitor C3 and saturable reactor SR1, and much of this energy will be prevented from reaching the detector relay DR due to the fact that it also can flow through the fault F. As a result of this condition, the magnitude of third harmonic energy flowing through the capacitor C2 and transformer T2 will be reduced to the point where the contacts of the detector relay DR will release. With contact a of the detector relay DR released, an obvious circuit is established for supplying energy to the trip magnet TM of the circuit breaker CB. Thus, the trip latch TL of the circuit breaker will be disengaged from the hook of the operating handle H, and the operating spring S1 of the circuit breaker will force the handle H upward, to thereby open contacts B1 and B2 and cut off the supply of direct current energy to the circuit.

Additionally, when contact a of detector relay DR releases, a circuit is established for supplying energy to the warning lamp WL, to thereby provide a suitable warning signal for an operator to indicate that a fault has taken place on the transmission system.

The action of the saturable reactor SR1 and capacitor C3, located at the remote end of the line, is to distort the waveform of the test frequency current flowing in the transmission line. The capacitor and reactor constitute a non-linear impedance. The impedance of these elements is dependent upon the magnitude of the impressed potential. The current flowing therethrough is not directly proportional to the impressed potential, but is dependent upon both the impressed potential and the change in the impedance of these elements produced by the potential applied thereto. The result is that a sinusoidally impressed potential results in a current flow which is not sinusoidal, and hence the production of harmonics of the frequency of the impressed potential.

Protection is also provided against faults of the open circuit variety. A broken conductor, which is an open circuit fault, may create a dangerous condition. The ends of the broken conductor may fall upon personnel or assume a position such that personnel may come into contact with it. This unsafe condition is prevented by the apparatus, as an open circuit fault results in the operation of the circuit breaker CB which cuts off the supply of energy to the line.

For example, let it be assumed that the continuity of a conductor is broken at any point between the junction of the transmission line with transformer T1 and capacitor C1, and the remote end of the line where capacitor C3 and reactor SR1 are located. In this instance the capacitor C3 and reactor SR1 are deprived of the 60 cycle energy and consequently the third harmonic or 180 cycle energy will cease to flow in the transmission line. This results in a deenergization of relay DR which causes the circuit breaker CB to open to disengage the transmission line from the supply of power as heretofore described.

It will be apparent to those skilled in the art that a number of changes and modifications may be made in the arrangement shown in the drawing, while still obtaining the same end results. For example, the detector relay DR may be utilized to govern only the warning lamp or the trip magnet alone, instead of operating both devices as shown. Additionally, other apparatus may be provided for operating the circuit breaker, such as undervoltage releases, etc. Moreover, it will be apparent that my invention is not limited to the use of frequency conversion equipment of the type shown but may employ any suitable means for converting the energy received at the remote end of the line to energy at a different frequency which is retransmitted from the remote end of the line, such, for example, as motor-alternator sets, electronic oscillator equipment, vibrator type frequency converters, etc.

It will be seen that in accordance with my invention the clearing of the fault will be indicated at the supply point by the picking up of the appropriate detector relay, thereby extinguishing the associated warning lamp. The operating handle H of the circuit breaker can then be pulled down to close contacts B1 and B2 to restore the supply of power to the system. With trip magnet TM deenergized, the trip latch TL will engage the hook of handle H, to thereby hold the circuit breaker closed.

It will be further apparent that suitable meters may be employed at the supply point to measure the magnitude of the transmitted and received test energy, such as by connecting suitable ammeters in series with the supply circuit and the receiving filter circuit. By observing the magnitude of the transmitted and received test energy, any gradual deterioration of the transmission line insulators may be determined, since the magnitude of the transmitted energy will increase and the magnitude of the received energy will decrease.

Although I have herein shown and described only one form of means for detecting electrical circuit faults according to my invention, it is to be understood that various changes and modifications may be made therein within the scope of the appended claims without departing from the spirit and scope of my invention.

Having thus described my invention, what I claim is:

1. In a power system network for transmitting direct current energy from a first to a second point, means for detecting faults in said network comprising means for supplying alternating current energy at a first frequency to said network at said first point, means at said second point for converting said energy at said first frequency to energy at a second frequency different from said first frequency, and means connected to said network at said first point and responsive only to the magnitude of energy at said second frequency received at said first point from said second point.

2. In a power system network for transmitting direct current energy from a first to a second point, means for detecting faults in said network comprising means for supplying alternating current energy at a first frequency to said network at said first point, means at said second point for converting said energy at said first frequency to energy at a second frequency different from said first frequency, means connected to said network at said first point and responsive only to the magnitude of energy at said second frequency received at said first point from said second point, and effective when said energy at said second frequency drops below a predetermined magnitude to interrupt the supply of direct current energy to said network.

3. In a power system network for transmitting direct current energy from a supply point to at least one load, said load having an increasing impedance with respect to frequency, means for determining the presence of short-circuit faults on said network comprising means at said supply point for supplying alternating current energy at a first frequency, means at the end of said network remote from said supply point for receiving energy at said first frequency, converting said received energy to energy at a second frequency substantially higher than said first frequency and supplying said converted energy at said second frequency to the network at said remote end thereof; and means located at said supply point and responsive only to the magnitude of energy at said second frequency supplied thereto over said network from the remote end thereof.

4. In a power system network for transmitting direct current energy from a supply point to at least one load, said load having an increasing impedance with respect to frequency, means for determining the presence of short-circuit faults on said network comprising means at said supply point for supplying alternating current energy at a first frequency to said network, means at the end of said network remote from said supply point for receiving energy at said first frequency, converting said received energy to energy at a second frequency substantially higher than said first frequency and supplying said converted energy at said second frequency to the network at the remote end thereof; relay means located at said supply point and responsive only to the magnitude of energy at said second frequency supplied thereto over said network from the remote end thereof, and means governed by said relay means for cutting off the supply of direct current energy to said network when the magnitude of energy at said second frequency falls below a predetermined value.

5. In a direct current power distribution system for supplying direct current energy from a supply point to at least one direct current load by a transmission line, means for detecting short-circuit faults on said transmission line comprising means at said supply point for supplying alternating current at a first frequency to said transmission line, means located at the remote end of said line for receiving said alternating current energy at said first frequency, converting said alternating current energy to alternating current energy at a second frequency, and supplying said alternating current energy at said second frequency to said transmission line, means located at said supply point and responsive only to the magnitude of alternating current energy at said second frequency supplied thereto over said transmission line from the remote end of said line.

6. In a direct current power distribution system for supplying direct current energy from a supply point to at least one direct current load by a transmission line, including circuit breaker means for interrupting the direct current energy supplied to said line, fault detecting means for operating said circuit breaker means to interrupt the supply of direct current energy to said line in the event of a short-circuit fault on the line but not in the event of an overload current drawn by said direct current load, said fault detecting means comprising a source of alternating current energy at a first frequency, means for supplying energy from said source to said line at said supply point, means at the remote end of said line for receiving said alternating current energy at said first frequency, generating energy at a harmonic frequency of said first frequency and supplying said energy at a harmonic frequency to said line, filter means tuned to said harmonic frequency and connected to said line at said supply point, a detector relay energized by the output of said filter means, and means governed by said detector relay for operating said circuit breaker when the magnitude of energy at said harmonic frequency at said supply point decreases below a predetermined value.

7. Fault detecting apparatus for a power distribution network comprising, a source of energy having a first frequency connected to the network at a first point, means connected to the network at a second point for converting the first frequency energy to energy at a harmonic of said first frequency, supplying said harmonic frequency energy to the network at the second point, and means for measuring the amplitude of said harmonic frequency current at a third point in the network.

8. Fault protecting apparatus for a direct current power distribution network comprising, a source of alternating current energy having a first frequency connected to the network at a first point, means located near the remote end of the network for converting the first frequency energy to energy at a second frequency, means located near the supply end of said network for measuring the amplitude of the current of the second frequency energy, and means for cutting off the supply of direct current power to the system when the amplitude of the second frequency current drops below a predetermined value.

9. Fault detecting apparatus for a direct current power transmission network comprising, a source of alternating current energy of a first frequency connected to the network at one point, waveform distorting means connected to the network at a second point, and a waveform detecting means connected to said network at a third point for detecting changes in the amplitude of a harmonic current contained within the distorted waveform.

10. Fault protecting apparatus for a power transmission system comprising, a source of direct current energy being distributed to at least one load having a rising impedance versus frequency characteristics, an alternating current potential source having a first waveform connected to the system near the supply end, waveform distorting means connected to the system near the remote end, waveform sensitive means located near the supply end of said system, means for cutting off the source of direct current energy being distributed by said system in accordance with changes in the relative amplitudes of the harmonics contained within the distorted waveform as produced by the occurrence of faults in said system.

References Cited in the file of this patent
UNITED STATES PATENTS

| | | |
|---|---|---|
| 899,127 | Neu | Sept. 22, 1908 |
| 1,831,420 | Ludwig | Nov. 10, 1931 |
| 2,495,791 | Daele et al. | Jan. 31, 1950 |